(12) United States Patent
Goto et al.

(10) Patent No.: US 7,315,798 B2
(45) Date of Patent: Jan. 1, 2008

(54) METHOD OF IDENTIFYING BOUNDARY CONDITION BETWEEN COMPONENTS OF OBJECT OF ANALYSIS

(75) Inventors: Yoshitsugu Goto, Tajimi (JP); Tatsuyuki Amago, Aichi-ken (JP); Yoshio Kojima, Cologne (DE); Mizuho Inagaki, Toyoake (JP); Kazuaki Chiku, Nisshin (JP); Toru Matsushima, Mishima (JP); Keisuke Hayakawa, Toyota (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 315 days.

(21) Appl. No.: 10/630,776

(22) Filed: Jul. 31, 2003

(65) Prior Publication Data

US 2004/0093195 A1  May 13, 2004

(30) Foreign Application Priority Data

Aug. 1, 2002  (JP) .............................. 2002-224688

(51) Int. Cl.
*G06F 7/60* (2006.01)
*G06F 17/10* (2006.01)

(52) U.S. Cl. ......................................................... 703/2
(58) Field of Classification Search .................... 703/2; 364/507

See application file for complete search history.

(56) References Cited

U.S. PATENT DOCUMENTS 5,327,358 A * 7/1994 Stubbs ........................ 702/36

FOREIGN PATENT DOCUMENTS

| JP | 5-209805 | 8/1993 |
| JP | 6-290225 | 10/1994 |
| JP | 10-207926 | 8/1998 |
| JP | 10-301979 | 11/1998 |
| JP | 11-281522 | 10/1999 |
| JP | 2001-117952 | 4/2001 |
| JP | 2002-15010 | 1/2002 |

OTHER PUBLICATIONS

Liu "System Implementation, Modeling, and Defects Pattern Recognition for Flip Chip Solder Joint Inspection using Laser Techniques" Mar. 2001.*
MSC.Nastran 2001 Installation and Operations Guide.*
ANSYS Software Package, 2001.*

* cited by examiner

Primary Examiner—Kamini Shah
Assistant Examiner—Saif A Alhija
(74) Attorney, Agent, or Firm—Oblon, Spivak, McClelland, Maier & Neustadt, P.C.

(57) ABSTRACT

A natural frequency and a calculated mode vector are calculated by using a finite-element method models for analysis which include an object of analysis including a plurality of components and a plurality of elements which are positioned between the components of the object of analysis and indicate a boundary condition between the components, the calculated mode vector having high degree of correlation for an experimental mode vector is extracted and set to a pair, and identifying the boundary condition of the elements based on the extracted calculated mode vector and the natural frequency corresponding to the extracted calculated mode vector.

9 Claims, 7 Drawing Sheets

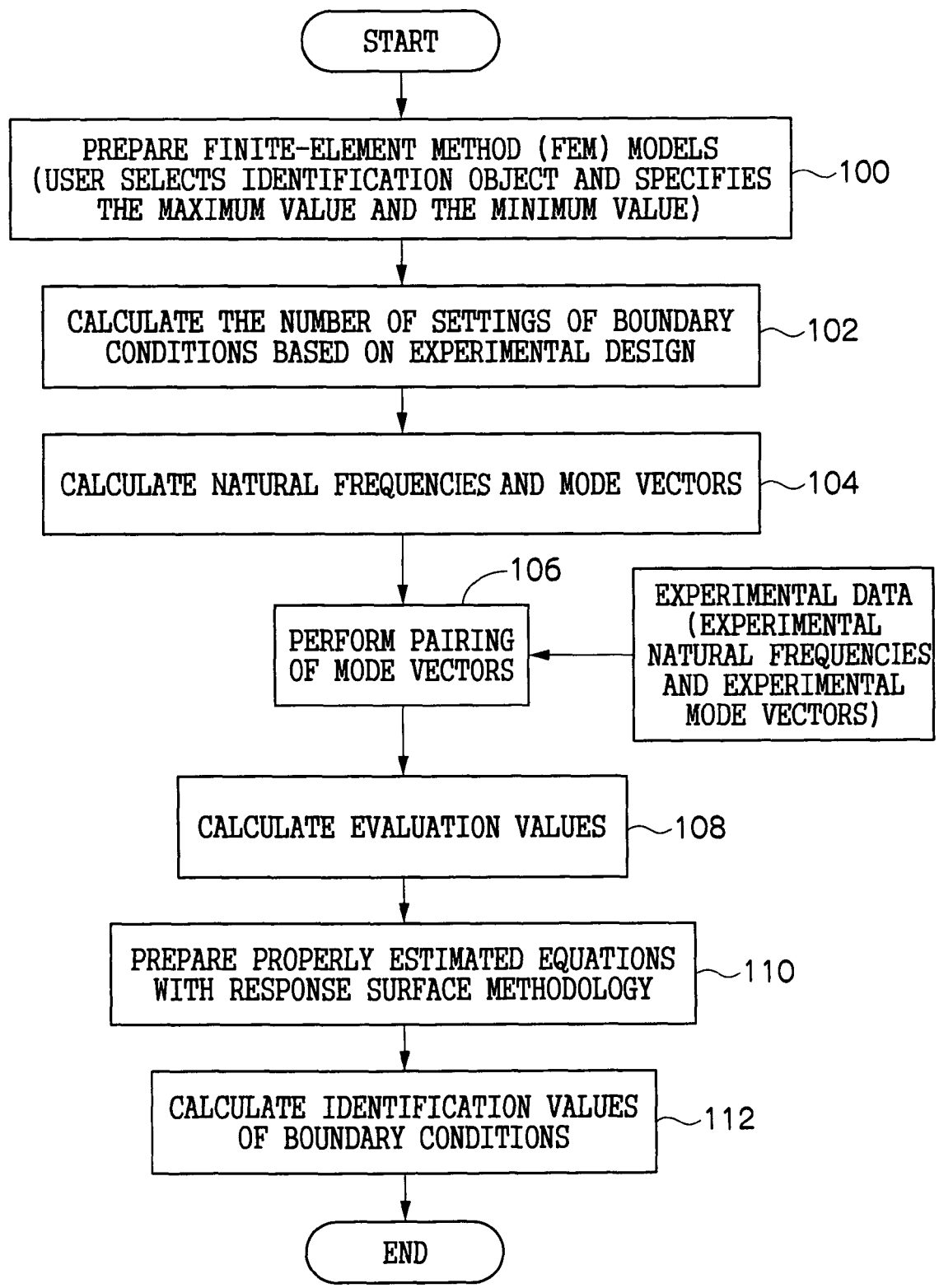

FEM MODEL

EXAMPLE OF SPRING BETWEEN COMPONENTS

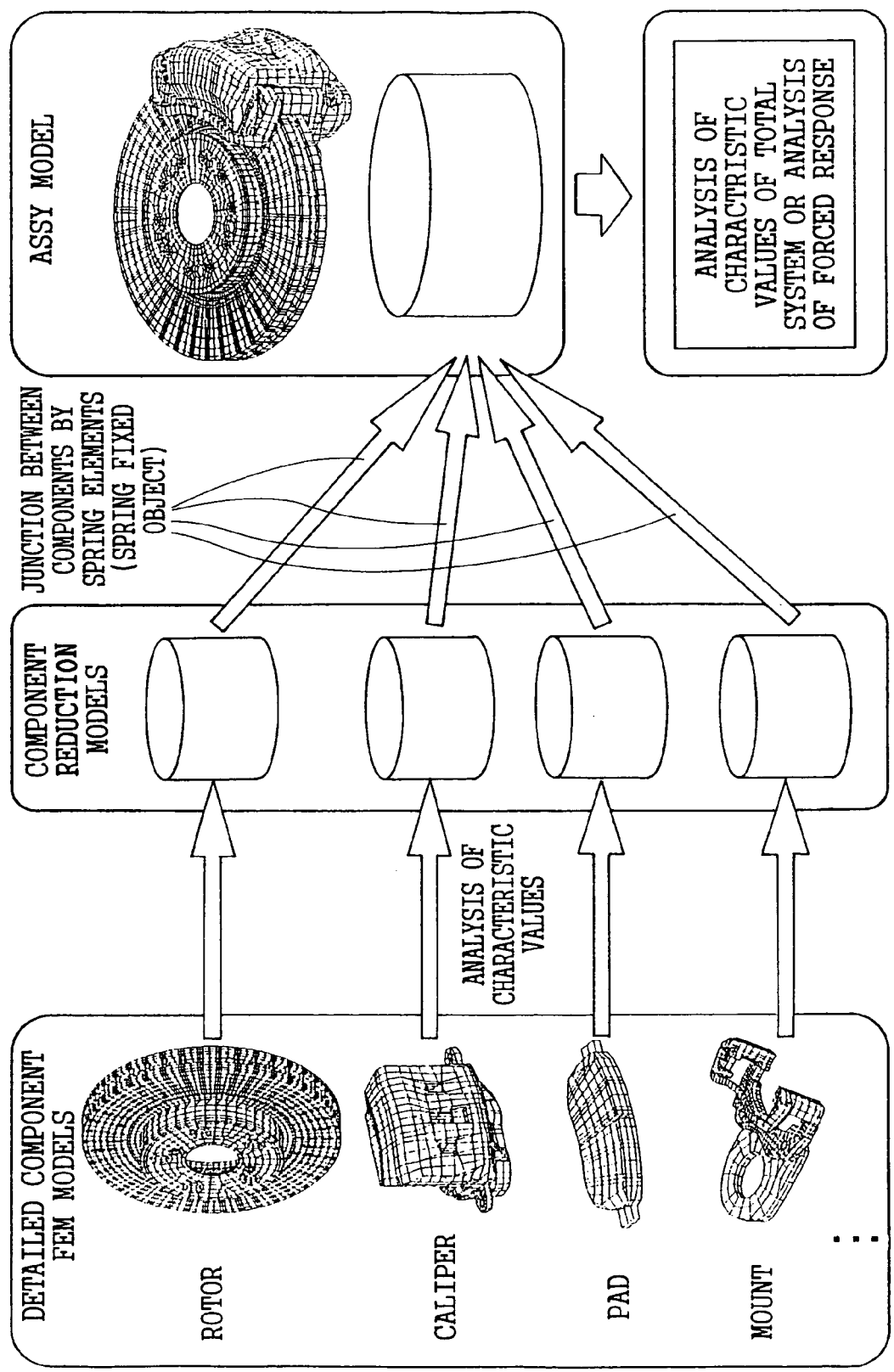

METHOD OF IDENTIFYING BOUNDARY CONDITION BETWEEN COMPONENTS OF OBJECT OF ANALYSIS

CROSS-REFERENCE TO RELATED APPLICATION

This application claims priority under 35USC 119 from Japanese Patent Application No. 2002-224688, the disclosure of which is incorporated by reference herein.

BACKGROUND OF THE INVENTION

1. Field of the Invention

The present invention relates to A method of identifying a boundary condition between components of an object of analysis, particularly relates to the method of identifying the boundary condition between components, which replaces the object of analysis such as a structure or a mechanism with a finite-element method model for vibrational analysis or motion analysis and identifies the boundary condition between the components in the finite-element method model based on reference data obtained by an experiment.

2. Description of the Related Art

In Japanese Patent Application Laid-Open (JP-A) No. 05-209805, there is described a method for changing an unknown parameter to identify the parameter of a spring-particle system while comparing a natural frequency obtained by the experiment to the natural frequency determined by calculation as the identification method for the parameter of the spring-particle system.

However, in the above-described related art, a shape, a configuration, topology of a structure, and the like are not preserved because the object of analysis is replaced with a particle system. Therefore, there is a problem that a detail mode can not be used for the identification because information of the mode including the information of the shape, the configuration and the topology is lacked, besides not performing precise analysis up to a high frequency.

Further, because the above-described related art is based on a dynamic system such as the spring-particle system, there is the problem that it is difficult to expand the related art to a system having multi-degree of freedom or a discrete model of the structure such that a dynamical equation of the system can not be explicitly expressed and it is difficult to apply an actual problem.

When an error is mixed into the data used in formulating the dynamical equation of the system and identifying the system by adopting a least squares method or the like, sometimes there is caused such physical contradiction that the spring or mass becomes negative. In the method making a search for a value minimizing difference between an experimental result and a calculated result while an identification constant is gradually changed, there is a tendency to fall into a local solution at which arrives by using only specific variables having high sensitivity, so that sometimes there is the case in which an correct identification value is not obtained.

In JP-A No. 06-290225, there is described the method for expressing fuzziness of constraint and an objective in fuzzy (membership function) to design automobile components by utilizing an experimental design. In JP-A No. 10-207926, there is described a design-support method of the structure or the like, which utilizes the experimental design and response surface methodology for making an impact analysis/design equation of a plate thickness in buckling or crushing.

In JP-A No. 2001-117952, there is described an optimal design system which adopts the experimental design and the response surface methodology and utilizes a building block approach to make an input-format database suitable for the building block approach. In JP-A No. 10-301979, there is described a parameter extracting method of a model for simulation of a process, a device, and a circuit of a semi-conductor integrated circuit, which extracts the parameter having the high sensitivity by utilizing the experimental method and discriminate between good and bad range setting to automatically reset the range.

In JP-A No. 11-281522, there is described an analytic method of vibrational characteristics which makes the equation from the natural frequency obtained by the experiment and the shape of a natural mode and determines a mass matrix [M] and a stiffness matrix [K], which become a characteristic matrix by adopting the least square method. In this method, the characteristic matrix having the more degrees of freedom can be obtained from the small number of modes obtained in the experiment. However, that the characteristic matrix is a symmetric matrix and has no damping are conditions on expansion of the equation.

SUMMARY OF THE INVENTION

The present invention is proposed in order to solve the above-described problems.

In the present invention, there is provided a method of identifying a boundary condition between components of an object of analysis, the method comprising the steps of: calculating natural frequencies or resonance frequencies of finite-element method models and calculated mode vectors by using the finite-element method models for analysis which include an object of analysis including a plurality of components and a plurality of elements which are positioned between the components of the object of analysis and indicate a boundary condition between the components, extracting a calculated mode vector having a high degree of correlation for an experimental mode vector obtained in an experiment; and identifying the boundary condition of the elements based on the extracted calculated mode vector and the natural frequency or the resonance frequency corresponding to the extracted calculated mode vector.

The invention utilizes the finite-element method model in which information of a shape or topology is also included and a vibration mode or a moving mode of a structure or a mechanism can be actually sufficiently expressed.

In order to precisely and quantitatively handle the vibration or the motion in vibration analysis or motion analysis, it is necessary to model the shape, a configuration, and the topology of the structure or the mechanism without omitting them as much as possible. The invention adopts the finite-element method models, and the object of analysis is not performed to simple modeling of the spring/particle system like the related art, so that the vibration analysis or the motion analysis can be precisely performed up to the high frequency band.

By adopting the finite-element method models, image information which expresses in detail the shape, the configuration, and the topology can be utilized as reference data required in the identification. Accordingly, even when the complicated mode vector appears, the complicated mode vector can be utilized for the identification and preciseness of the identification can be improved.

When the object of analysis is simply modeled to the spring/particle system like the related art, a physical meaning becomes difficult and the skilled operator is required.

However, since the invention adopts the finite-element method models, the boundary condition at a position in a real three-dimensional space is directly recognized. Accordingly, the skilled operator is not required.

In the invention, a vibrating mode or a moving mode (mode vector) of the structure or the mechanism, which is the identification object, may correspond by performing arithmetic operation between the mode vector of the reference data determined by the experiment and the calculated mode vector obtained by analytic result.

In order to determine a degree of correlation of the mode vector, MAC (Modal Assurance Criteria) adopted in the analysis of the degree of correlation is utilized. MAC is effective for the case in which the mode vectors to be compared are the same or almost the same. However, when a degree of difference of the mode vectors to be compared is widened and a value of MAC becomes not more than 0.9 or 0.8, the degree of correlation of the mode vectors to be compared is often shifted from human sense.

Therefore, in the invention, the degree of correlation may be determined at least one time by residual degrees of freedom when the degrees of freedom giving the large degree of correlation during elimination from arithmetic operation are eliminated n numbers at a time; and the calculated mode vector having the large number of residual degrees of freedom when the degree of correlation exceeds a threshold may be extracted as the calculated mode vector having the high degree of correlation for the experimental mode vector.

The n number of degrees of freedom eliminated from the mode vector having the m number of degrees of freedom is obtained in such a manner that the arithmetic operation is performed for each degree of freedom while the degree of freedom eliminating the degree of correlation in eliminating one degree of freedom from the arithmetic operation differs and the n number of degrees of freedom is selected in the order in which the degree of correlation is large.

Thus, the degree of correlation calculated by the residual degrees of freedom is increased in each step of the elimination of the degrees of freedom in such a manner that the degree of freedom, in which the degree of correlation is maximized in the elimination from the arithmetic operation, is eliminated by the n number of degrees of freedom. Accordingly, when the degree of correlation exceeds a threshold, it is possible to decide that the degree of correlation is high, as the degrees of freedom to be eliminated are decreased, i.e. as the residual degrees of freedom are increased.

The natural frequency or the resonance frequency of each element and the calculated mode vector can be calculated by setting a plurality of conditions for each element and the plurality of levels for each of the plurality of conditions and adopting the experimental design.

Thus, the required value of the boundary condition can be determined by performing the calculation with the experimental design only in such a manner that an operator selects the boundary condition of the identification object and levels (for example, maximum value and minimum value) of the boundary condition are set. When a true value is out of the range of the levels, the levels may be reset.

When the finite-element method model becomes a large scale, a mode reducing model of a single component in which the mode vector up to a necessary frequency band is adopted may be used as the component of the finite-element method model. Accordingly, the boundary condition between components of the object of analysis can be efficiently identified.

In the boundary condition of each element of the invention, an evaluation value indicating an error between the experiment and the calculation for each of a plurality of conditions can be calculated arithmetic operation based on the extracted calculated mode vector and the natural frequency or the resonance frequency corresponding to the extracted calculated mode vector, the boundary condition of each element can be identified so that the evaluation value is minimized.

In the identification of the experimental design, when the range of the boundary condition is set, an orthogonal table according to levels is made based on the experimental design, the necessary analysis such as structural analysis or analysis of characteristic value is performed for each condition, the evaluation value is calculated based on an error of a vector quantity or a scalar quantity between those analytic results and the reference data, analysis of variance is performed in each condition from a relationship between the boundary condition and the evaluation value to make an estimated equation, and then optimum calculation which minimizes the evaluation value based on the error can be performed based on a method of physically optimum calculation, so that the identification value can be automatically obtained.

Since the value of the boundary condition has a solution only within an initial setting range, i.e. within levels, the stable solution is obtained without divergence. When the maximum value or the minimum value becomes the solution within the initial setting range, the value of the correct boundary condition can be determined in such a manner that the setting range is changed for only a setting value of the corresponding boundary condition and identification calculation is performed again.

In performing the above-described identification calculation, the number of calculated mode vectors calculated when the boundary condition is set to a setting value in orthogonal table assignment is huge, and it can not be discriminated which mode vector is applicable to the mode vector of reference data, so that the evaluation value can not be calculated based on an error between the calculated mode vector and the mode vector of the reference data.

However, in the above-described identification, the mode vector corresponding to the mode vector of the reference data can be automatically found out among the enormous calculated mode vectors, so that the evaluation value can be calculated based on the error and the identification value can be obtained.

As described above, according to the invention, the vibration or the motion can be precisely and quantitatively handled and the analysis up to the high frequency band can be precisely performed.

BRIEF DESCRIPTION OF THE DRAWINGS

FIG. 2 is a flowchart showing an identification routine of the embodiment of the invention.

FIG. 7 is a schematic view showing an example of an analysis model in which the FEM models are degenerated.

DESCRIPTION OF THE PREFERRED EMBODIMENTS

Figure 1:
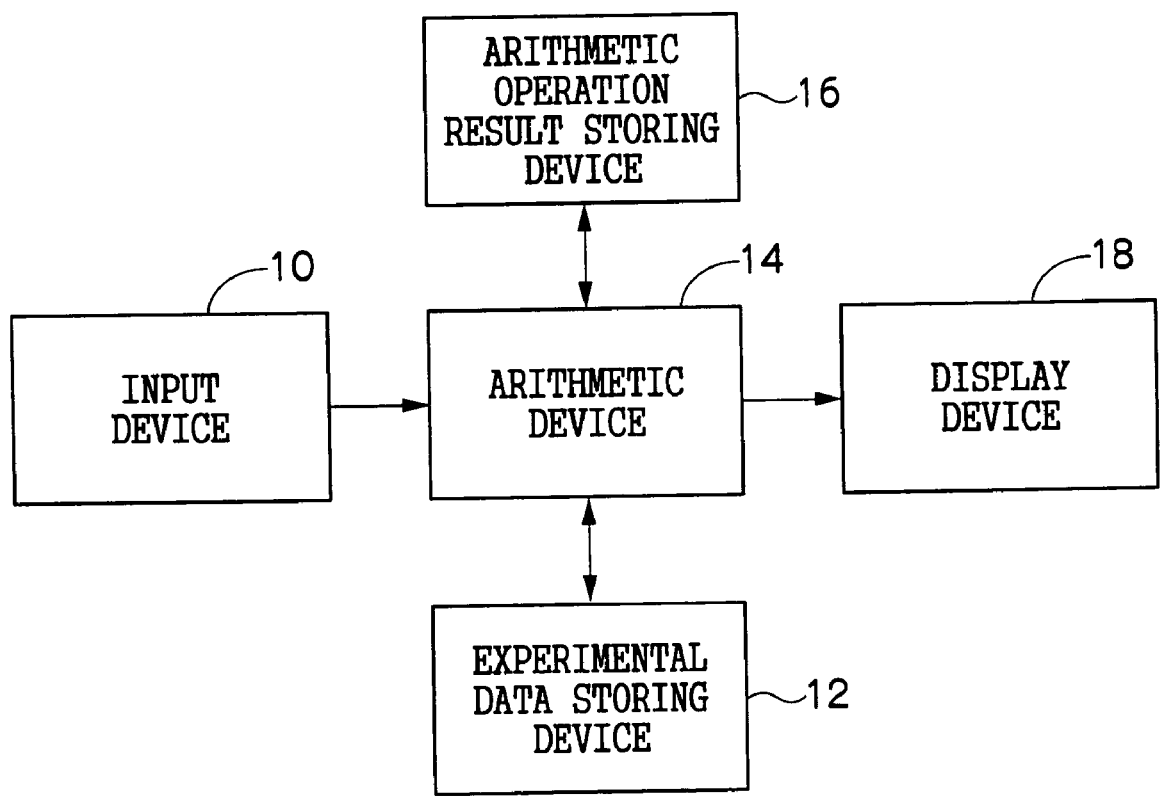
FIG. 1 is a block diagram of an identification apparatus for practicing the method of identifying the boundary condition between the components according to an embodiment of the present invention.

Referring to the accompanying drawings, preferred embodiments of the present invention will be described in detail below. FIG. 1 shows the identification apparatus for practicing the method of identifying the boundary condition between the components of the object of analysis according to the invention.

The identification apparatus has an input device 10 which inputs data, the boundary condition, an identification object, and level values of the object of analysis, an experimental data storing device 12 which includes a memory storing natural frequencies and mode vectors of each mode determined from the experiment, an arithmetic device 14 comprising a computer which performs arithmetic operations on the natural frequencies, the mode vectors and the like of the identification object, and performs arithmetic operations based on an evaluation value, on an identification value and the like of the identification object, an arithmetic operation result storing device 16 which includes a memory storing the natural frequencies, the mode vectors and the like of the identification object, on which the arithmetic operations have been performed by the arithmetic device 14, and a display device 18 which includes a CRT or the like displaying the identification value and the like, on which the arithmetic operations have been performed.

An identification routine executed by the arithmetic device 14 will be described below referring to FIG. 2. A control program for executing the identification routine may have been recorded in the arithmetic device 14 (ROM, a hard disk, or the like) or transmitted from other computers which is connected via a network.

In step 100, the arithmetic device 14 prepares finite-element method models (FEM models) including the boundary condition between the components based on data input from the input device 10 and captures data of the identification object of the boundary conditions selected by the input device 10. The arithmetic device 14 may perform the preparation by previously capturing only the necessary FEM models from the input data 10.

The identification object of the boundary condition may be either stiffness or damping characteristics of a contact portion between components. In the identification object of the boundary condition, usually the characteristics of the stiffness is modeled by the spring expressing translation or rotation, or the damping is modeled by a dashpot or structural damping which expresses the translation or the rotation. Further, the identification object of the boundary condition may be a spring between components of objects. At this point, the boundary condition can be identified by identifying a spring constant of the spring between components.

The following embodiments are described by citing the identification of the spring constant as an example. However, as described above, the identification object is not limited to the spring constant.

An operator previously selects the spring between components which becomes the identification object through the input device 10 and specifies a range (maximum value and minimum value) of the spring constant of the spring between components. Consequently, the maximum value and the minimum value of each identification object (spring constant of each spring between components) are read in the arithmetic device 14 as shown in Table 1.

The operator may specify, via the input device 10, the level of the spring constant, to which the experimental design, discussed later, is applied. The level may be previously set. In the embodiment, though the description is performed by citing three levels as an example, other levels may be used.

TABLE 1

|  | IDENTI-FICATION OBJECT 1 | IDENTI-FICATION OBJECT 2 | IDENTI-FICATION OBJECT 3 | · · · |
|---|---|---|---|---|
| MINIMUM VALUE |  |  |  |  |
| MAXIMUM VALUE |  |  |  |  |

Figure 3A:
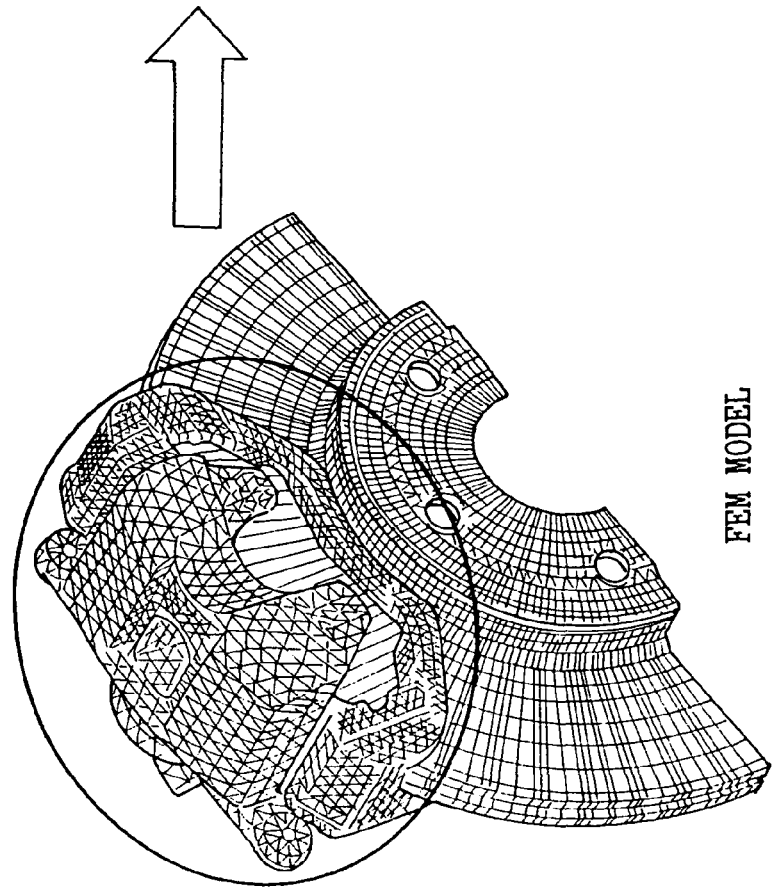
FIG. 3A is a schematically perspective view showing FEM models of an automobile brake.
Figure 3B:
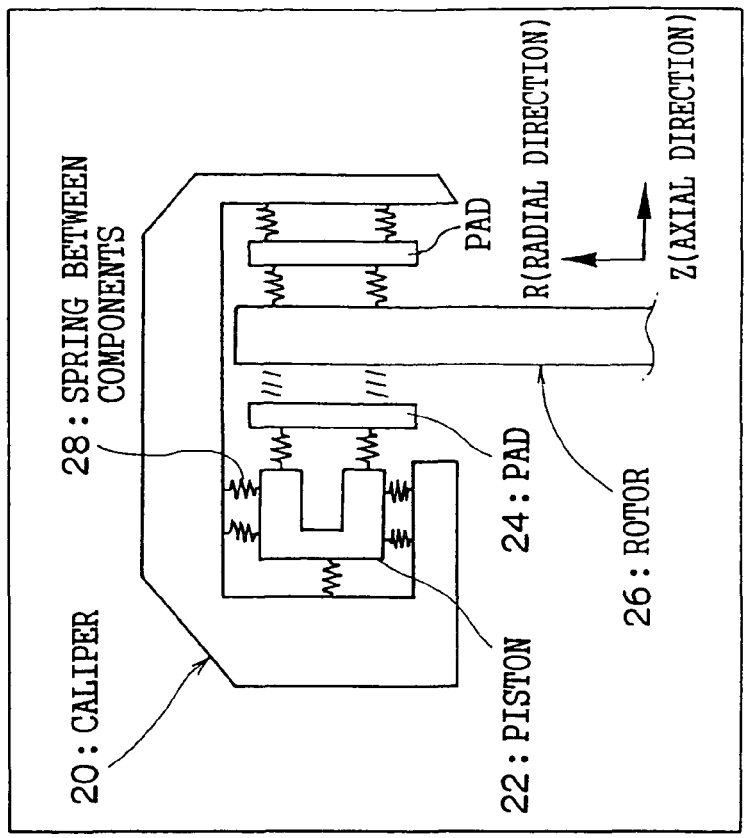
FIG. 3B is a sectional view showing an example of springs between components.

FIG. 3A shows the example of the FEM model of the automobile brake. FIG. 3B shows the example of the springs between components when the local stiffness of the contact portion between components is set to the identification object. As can be seen from FIG. 3B, the components of the FEM model of the automobile brake include a caliper 20, a piston 22, brake pads 24, and a rotor 26. The plurality of springs 28 between components intervenes between these components.

The spring 28 between components to be identified is expressed by the value which the spring constants are summed up in each region. In the spring between components of the FEM model, the values are distributed considering a distribution in the region. Even when the damping is set to the identification object, the same treatment is performed by arranging the dashpots parallel to the spring between components.

In step 102, the arithmetic device 14 performs the arithmetic operation for the number of settings of the boundary conditions based on the experimental design. That is to say, the arithmetic device 14 performs the arithmetic operation for the number of settings of the boundary conditions, which is uniquely determined by the number of selected identification objects and the number of specified levels in step 100.

The number of settings is uniquely determined by the number of selected identification objects and the number of specified levels. Accordingly, for example as shown in Table 2, when the number of identification objects is set to 12 and the number of setting levels is set to three levels of the minimum value, the maximum value, and an intermediate value, the arithmetic device 14 sets the 27 kinds of the boundary conditions. The intermediate value is the value determined by performing the arithmetic operation for an average of the maximum value and the minimum value.

TABLE 2

| | BOUNDARY CONDITION 1 | BOUNDARY CONDITION 2 | BOUNDARY CONDITION 3 | ·· · | BOUNDARY CONDITION 27 |
|---|---|---|---|---|---|
| IDENTIFICATION OBJECT 1 | MINIMUM VALUE | INTERMEDIATE VALUE | MAXIMUM VALUE | ·· · | |
| IDENTIFICATION OBJECT 2 | MINIMUM VALUE | MINIMUM VALUE | INTERMEDIATE VALUE | ·· · | |
| IDENTIFICATION OBJECT 3 | MINIMUM VALUE | MINIMUM VALUE | INTERMEDIATE VALUE | ·· · | |
| ... | ... | ... | ... | ·· · | |
| IDENTIFICATION OBJECT n | MINIMUM VALUE | INTERMEDIATE VALUE | MAXIMUM VALUE | ·· · | |

In step 104, the arithmetic device 14 carries out characteristic value analysis in each boundary condition to perform the arithmetic operation for the natural frequencies and the calculated mode vectors and stores the arithmetic operation results of the calculated natural frequencies and the calculated mode vectors in the arithmetic operation result storing device 16. In order to prepare pairings of the mode described below, the arithmetic device 14 reads the calculated natural frequencies and the calculated mode vectors from the arithmetic operation result storing device 16 to arrange the calculated natural frequencies and the calculated mode vectors into the calculated mode vector of a nodal point restricted in the region which can be measured by the experiment so that the above-described calculated results can be compared to the experimental results.

The experimental natural frequencies and the experimental mode vectors obtained by the experiment are stored in the experimental data storing device 12. It is necessary that the experimental natural frequencies and the experimental mode vectors can be compared to the calculated natural frequencies and the calculated mode vectors calculated by the FEM models.

Therefore, each measuring point of the experiment corresponds to the nodal point of the FEM model closest to the each measuring point. For example, when data of the experimental mode vector is measured with a CCD camera, a coordinate system of the FEM model corresponds to the coordinate system of a CCD camera image. Considering pixel resolution of the CCD camera image, the position of the nodal point on which the FEM model focuses is substituted for the point moved by a pixels in an X-axis direction and by b pixels in a Y-axis direction, and an amplitude value in its pixel is set to an element of the value of the experimental mode vector.

In step 106, the arithmetic device 14 reads the experimental natural frequencies and the experimental mode vectors stored in the experimental data storing device 12, and performs the pairings of the experimental mode vector and the calculated mode vector arranged in the difference way in step 104. Hereinafter "pairing of the experimental mode vector and the calculated mode vector" is simply referred to as "pairing."

The pairing is the processing which extracts the calculated mode vector having the highest degree of correlation for the experimental mode vector under observation, i.e. the calculated mode vector most similar to the experimental mode vector. The pairing is required for calculating the evaluation values in the next step 108.

Figure 4:
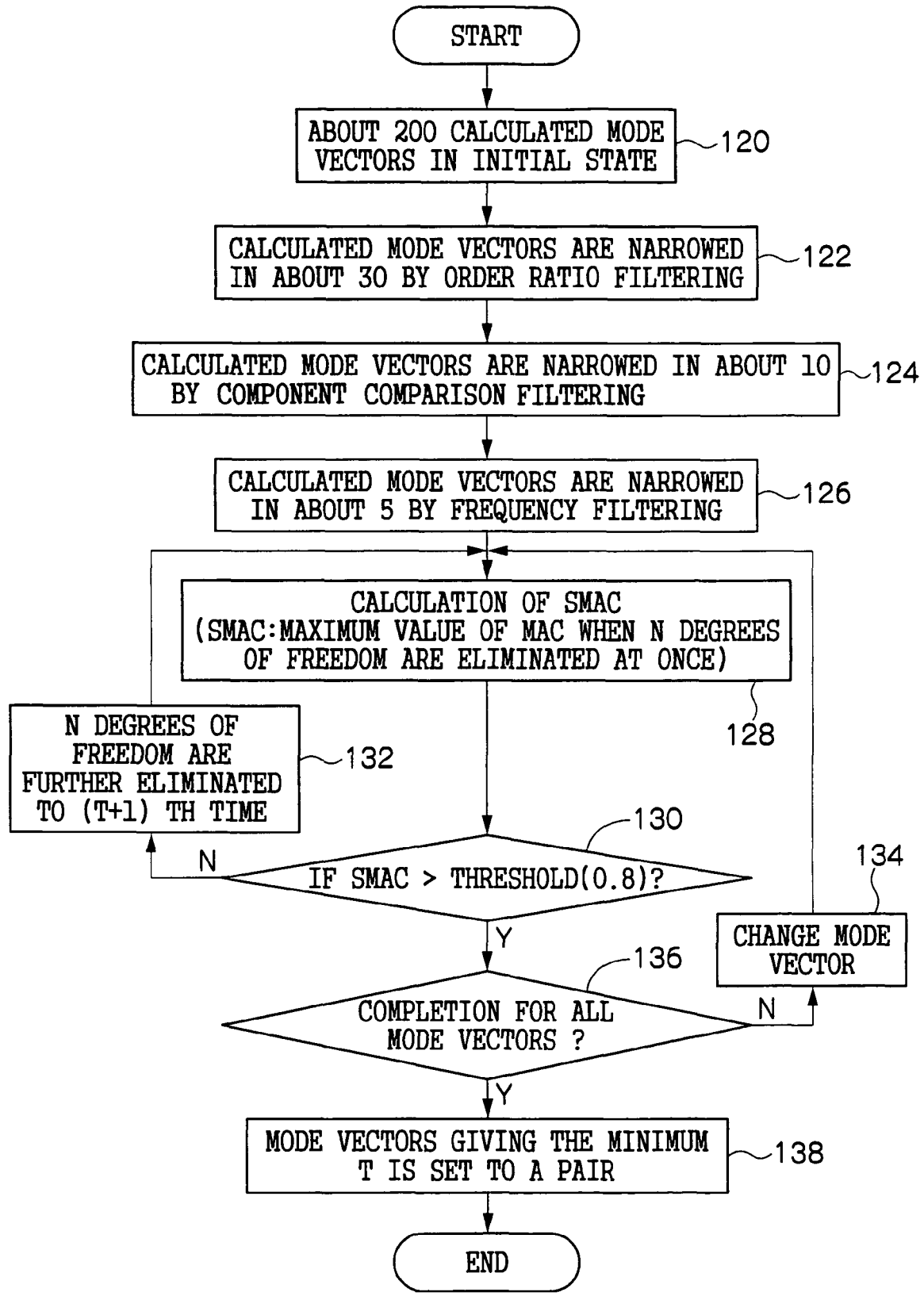
FIG. 4 is a flowchart showing a detail of pairing of the mode in FIG. 2.

The pairing will be described in detail referring to FIG. 4.

In step 120, the arithmetic device 14 selects the potential calculated mode vectors. In an initial state, the number of potential calculated mode vectors becomes several hundreds (for example, 200) in the degree of freedom of a large scale system such as the FEM model in which the actual structure is modeled. In the pairing, only one calculated mode vector most similar to the experimental mode vector (the calculated mode vector having the highest degree of correlation for the experimental mode vector) is extracted among the several hundreds of the potential calculated mode vectors.

When the pairing is performed, sometimes the extraction of the calculated mode vector can effectively reduce load of the arithmetic operation. In the embodiment, the arithmetic device 14 narrows the number of the calculated mode vectors into about 30 calculated mode vectors by performing order ratio filtering in step 122. The arithmetic device 14 further narrows the number of the calculated mode vectors into, e.g. about ten calculated mode vectors by performing component comparison filtering in step 124. Then, the arithmetic device 14 narrows the number of the calculated mode vectors into, e.g. about five calculated mode vectors by performing frequency filtering in step 126. Accordingly, the load of the arithmetic operation is remarkably reduced. The order of the filtering can be properly changed depending on situation.

Specifically in the order ratio filtering in step 122, the arithmetic device 14 performs the order ratio analysis in each axial direction of a proper coordinate system such as a spatial orthogonal coordinate or a cylindrical coordinate for each calculated mode vector. The arithmetic device 14 extracts only the calculated mode vectors in which the structure of the amplitude and a phase of each order ratio falls within the range of width specified from the structure of the amplitude and the phase of each order ratio in the experimental mode vector of the reference.

Explaining the rotor of the automobile brake shown in FIGS. 3A and 3B as the example, the arithmetic device 14 may extract the amplitude data in a radial direction, in which the central portion of the rotor is set to the center, at an interval of an angle θ and may extract only the calculated mode vector in which the order becoming the maximum amplitude corresponds to the experimental value.

In the component comparison filtering in step 124, the arithmetic device 14 performs the filtering for permitting the amplitude of other components within a permissible range for the amplitude of the most potential component. The calculated mode vectors which are not contained in the permissible range are set to out of the pairing.

For example, when the component becomes plural, sometimes a component A is overwhelmingly largely moved or a component B is overwhelmingly largely moved. In such a case, the calculated mode vectors can be excluded from the pairing of the mode vector only by examining the amplitude ratio between components without discriminating the complicated shapes. Therefore, the calculated mode vectors in which the amplitude ration between components becomes out of the permissible range are excluded from the candidate of the pairing of the mode by the component comparison filtering.

Explaining the rotor of the automobile brake shown in FIGS. 3A and 3B as the example, the arithmetic device 14 may calculate the amplitude ratios between components relative to the amplitude of the rotor (for example, amplitude ratio of rotor: 1.0, amplitude ratio of pad: 5.0, amplitude ratio of piston: 4.0, and the like) and exclude the calculated mode vectors in which the amplitude ratios becomes out of the permissible range from the candidate of the pairing.

This concept is not limited to the amplitude between components, and the concept can be also similarly applied to the phase between components or the amplitude and the phase within the same component.

In the frequency filtering in step 126, the arithmetic device 14 extracts only the calculated mode vectors corresponding to the calculated natural frequency which is contained in the range of the width (for example, ±500 Hz of experimental natural frequency) specified from the experimental natural frequency. The calculated mode vectors are set to the candidate object of the pairing.

In the arithmetic device 14, the order ratio filtering, the component comparison filtering, and the order ratio filtering may be used by selecting one of them or used by combining two of them. The pairing may be performed without using the filtering.

In order to extract the calculated mode vectors similar to the experimental mode vectors by performing the pairings, the following equation (1) of MAC expressing the degree of correlation of the mode vector is usually utilized.

$$MAC = \frac{|A_m^T \cdot B_m|^2}{(A_m^T \cdot A_m)(B_m^T \cdot B_m)} \quad (1)$$

MAC is effective for the case in which the compared mode vectors are the same or almost the same. However, when a degree of difference in the compared mode vectors is widened and the value of MAC becomes not more than 0.9 or 0.8, the degree of the similarity of the compared mode vectors is often sifted from a human sense. Particularly when some errors are mixed into the experimental result (experimental mode vectors or experimental natural frequencies) or the calculated value (experimental mode vectors or experimental natural frequencies) is determined by variously changing the values of the boundary conditions in the experimental design, the conventional MAC as it stands is not sufficient because the degree of correlation of the compared mode vectors is decreased.

Therefore, a technique referred to as SMAC (Super MAC) is adopted in the embodiment. AS shown in the following equation (2), SMAC expresses the maximum value of the degree of correlation MAC (maximum value of degree of correlation) when the n (1, 2, 3, . . . ) degrees of freedom are eliminated at once.

The maximum value of the degree of correlation which is performed arithmetic operation in step 128, i.e. a determining method of SMAC will be described below.

The degree of correlation MAC between a calculated mode vector $A_m$ and an experimental mode vector $B_m$, which have the m degrees of freedom is given by the equation (1). As shown in the following equation (2), instead of the degree of correlation MAC, the embodiment uses SMAC which expresses the maximum value of MAC when the n degrees of freedom are eliminated by one arithmetic operation.

$$SMAC = \text{MAX}\left(\frac{|A_{m-nt}^T \cdot B_{m-nt}|^2}{(A_{m-nt}^T \cdot A_{m-nt})(B_{m-nt}^T \cdot B_{m-nt})}\right) \quad (2)$$

MAX ( ) in the equation (2) is a function expressing the maximum value of the arithmetic operation result in the parenthesis. A reference sign of t indicates the number of arithmetic operations of SMAC. A reference sign of n indicates the number of degrees of freedom eliminated in one arithmetic operation.

The arithmetic operation of SMAC will be described. In step 128, the arithmetic device 14 calculates the value of the degree of correlation MAC between mode vectors $A_{m-1}$ and $B_{m-1}$ in which the degrees of freedom of mode vectors $A_m$ and $B_m$ have been eliminated by one degree of freedom. Further, this calculation is repeated in m times by orderly changing the eliminated one-degree of freedom. Then, the value of the degree of correlation MAC is calculated in each case in which the degree of freedom has been eliminated.

The arithmetic device 14 arranges the obtained m degree of correlations MAC in an order in which the value is large, eliminates the degrees of freedom in which the first to n-th values having the larger degree of correlation MAC are obtained, and performs the arithmetic operation for the degree of correlation MAC of mode vectors $A_{m-n}$ and $B_{m-n}$ having the (m-n) degrees of freedom according to the equation (1).

In step 130, the arithmetic device 14 decides whether the degree of correlation MAC of the mode vectors $A_{m-n}$ and $B_{m-n}$ exceeds a threshold (for example, 0.8) or not.

If the arithmetic device 14 decides that the degree of correlation MAC of the mode vectors $A_{m-n}$ and $B_{m-n}$ does not exceed the threshold in step 130, the arithmetic device 14 decides that the n degrees of freedom are further eliminated to perform the (t+1)th arithmetic operation in step 132 and returns to step 128.

Then, in the same way described above, the arithmetic device 14 repeats the calculation of the value of the degree of correlation MAC of mode vectors $A_{m-n-1}$ and $B_{m-n-1}$ in which the degree of freedom, from among the residual degrees of freedom, that corresponds to the mode vectors $A_{m-n}$ and $B_{m-n}$ has been eliminated, in order, by one degree of freedom.

Then, as described above, the arithmetic device 14 arranges the degree of correlations MAC in the order in which the value is large, eliminates the degrees of freedom in which the maximum to n-th values having the larger degree of correlation MAC are obtained, and performs the arithmetic operation for the degree of correlation MAC of mode vectors $A_{m-2n}$ and $B_{m-2n}$ having the (m-n) degrees of freedom according to the equation (1).

In step 130, the arithmetic device 14 decides whether the degree of correlation MAC of the mode vectors $A_{m-2n}$ and $B_{m-2n}$ exceeds the threshold or not.

On the other hand, if the arithmetic device 14 decides that the degree of correlation MAC of the mode vectors $A_{m-2n}$ and $B_{m-2n}$ exceeds the threshold, the arithmetic device 14 decides, in the step 136, whether the arithmetic operations of the degree of correlation between all the potential calculated mode vectors and the experimental mode vectors are performed or not. If the arithmetic operations for all the calculated mode vectors are not performed, the arithmetic device 14 changes the calculated mode vector to the next calculated mode vector to repeat the arithmetic operations of step 128 to step 130.

SMAC of the t-th arithmetic operation is expressed by the equation (2). At that point, if the degree of correlation MAC exceeds the threshold, the degree of freedom of the t-th $SMAC_T$ decreases from the initial degree of freedom m to (m-nt). That is to say, the eliminated degrees of freedom are equal to the nt degrees of freedom.

The degree of correlation is expressed by the eliminated nt degrees of freedom when SMAC is used. As shown in an equation (3), a degree-of-freedom residual ratio expressed by the ratio of residual degrees of freedom to the total m degrees of freedom is used as an index.

$$SMAC \text{ degree-of-freedom redidual ratio} = 1 - \frac{nt}{m} \quad (3)$$

In step 138, the arithmetic device 14 performs the arithmetic operation for the degree-of-freedom residual ratio and regards the calculated mode vector having the maximum value of the degree-of-freedom residual ratio, i.e. the calculated mode vector giving the minimum t as the high degree of correlation between the calculated mode vector and the experimental mode vector. The arithmetic device 14 sets the calculated mode vector having the maximum value of the degree-of-freedom residual ratio and the experimental mode vector to a pair.

Figure 5:
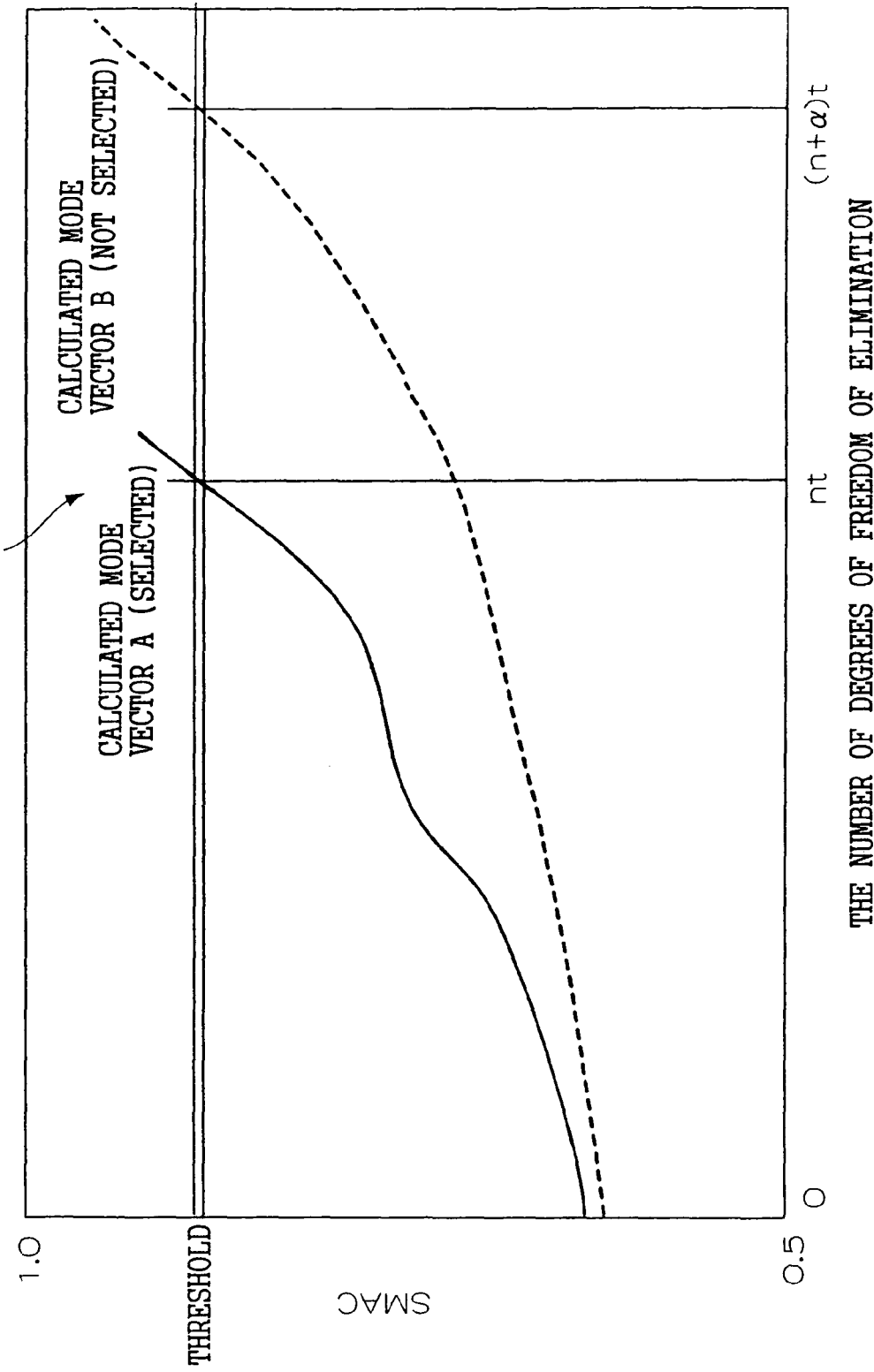
FIG. 5 is a diagram showing a change in SMAC for a degree of freedom of elimination.

FIG. 5 shows a relationship between the number of eliminated degrees of freedom and the maximum value of the degree of correlation (SMAC). In a calculated mode vector A, the maximum value of the degree of correlation exceeds the threshold while the eliminated degrees of freedom less than that of a calculated mode vector B. Accordingly, the calculated mode vector A is selected as the pair for the experimental mode vector.

When the component becomes plural, sometimes the case in which the component has many nodal points or the component has a few nodal points is caused. In such a case, when SMAC is simply calculated by setting all the nodal points to the object, there is a tendency for influence of the component having the many nodal points to be great. In order to avoid this tendency, the region in which SMAC may be calculated is divided in the components, a weighted average value may be calculated by properly assigning weights to the degree-of-freedom residual ratio of SMAC in each region, and the calculated weighted average value may be evaluated as the whole SMAC.

When the eliminated degrees of freedom are set to an arbitrary value in calculating SMAC, sometimes there is the case in which the important nodal point is eliminated. In such a case, a list of the nodal points, which are never eliminated, may be made and a process of the degree-of-freedom residual ratio of SMAC may be executed referring to the list. At this point, the nodal points which may be eliminated are the region having the high possibility that an error is mixed in the experimental values (experimental natural frequency or experimental mode vector) and the intermediate region between an antinode and a node of the mode vector. On the contrary, the nodal points, which must not be eliminated, are the region in which the experimental values can be judged to be apparently correct and the antinode and the node of the mode vector.

After performing the pairing of the mode in the above-described way, the arithmetic device 14 calculates the evaluation values in step 108. As shown in equations (4) and (5), for each of a scalar quantity (natural frequency) and a vector quantity (mode vector), a residual sum square of the experimental mode vector and the corresponding calculated mode vector by the pairing. As shown in an equation (6), these residual sum squares are normalized. As shown in an equation (7), the evaluation value in which multiplied by each normalized value is multiplied by the proper weight and added can be used.

\* For mode vector $$f(x) = \left\{ \frac{1}{m} \sum_{r=1}^{m} \frac{1}{D} \sum_{i=1}^{D} \beta_{ri} (\Phi_{ri} - \Phi_{ri}^*)^2 \right\}^{\frac{1}{2}} \quad (4)$$

\* For frequency $$g(x) = \left\{ \frac{1}{m} \sum_{r=1}^{m} \alpha_r (\lambda_r - \lambda_r^*)^2 \right\}^{\frac{1}{2}} \quad (5)$$

Specifically, the arithmetic device 14 calculates the residual sum square for each boundary condition shown in the orthogonal table of Table 2, normalizes the residual sum square with the average value of all the boundary conditions as shown in the equation (6), and set the added value to the evaluation value as shown in the equation (7).

Normalization: $f(x) \rightarrow \overline{f(x)}$, $g(x) \rightarrow \overline{g(x)}$ \quad (6)

Evaluation value=$w_m \overline{f(x)} + w_f \overline{g(x)}$ \quad (7)

Where, in the equation (4) to the equation (7),
x: vector of design variable (for example, the n number of identification objects)
$\lambda_r$: natural frequency of r-th order
$\Phi_{ri}$: mode vector of r-th order (i-th component)
$\lambda_r^*$: objective value of natural frequency of r-th order
$\Phi_{ri}^*$: objective value of mode vector of r-th order (i-th component)
m: the number of object modes
D: the number of object degrees of freedom
$\alpha_r$: weight of natural frequency of r-th order
$w_m$ and $w_f$: weight coefficients of vector and frequency
$\beta_{ri}$: weight of mode vector of r-th order (coefficient of i-th component)

One of the weight coefficients in the equation (7) is eliminated and the value using only the scalar quantity or the value using only the vector quantity can be also used as the evaluation value. The operator can freely select the total number of natural frequencies or mode vectors.

In step 108, the arithmetic device 14 obtains the evaluation value in each boundary condition of the orthogonal table of Table 2 by the experimental design.

In step 110, the arithmetic device 14 inputs these evaluation values for the total boundary conditions of the orthogonal table to perform analysis of variance by adopting the response surface methodology and evaluates the influence to make the proper estimated equation.

At this point, in making the evaluated equation with a multinomial, the multinomial having the order which can express its phenomenon is made. For example, when the estimated equation is made with the quadratic multinomial of second order, the level of the experimental design may be set to three in step 100. When the estimated equation is made with the quartic multinomial of 4th order, the level of the experimental design may be set to five in step 100. Thus, when the estimated equation is made with the multinomial of the n-th order, the level of the experimental design may be set to (n+1) in step 100. After confirming that the estimated equation can reproduce the evaluation value, the flow goes to the next step.

In step 112, the arithmetic device 14 defines the range of the initial values and the design variable X and determines the identification value of the spring between components 28 by adopting a complex method so that the estimated equation (error between experimental value and calculated value) is minimized.

As described above, in the identification apparatus of the embodiment, the identification value of the boundary condition can be easily obtained without diverging the solution in such a manner that only the operator watches the structure, selects the boundary condition of the identification object, and set the range of the boundary condition (maximum value and minimum value).

In the embodiment, the natural frequency and the mode vector of the structure are used as the evaluation index which is used in the identification. However, when the evaluation index corresponds to the experimental physical quantity, a resonance frequency in forced response and the mode vector at its frequency may be used or a moving form (mode vector) of the mechanism at certain time may be used. In such a case, instead of the analysis of the characteristic value in step 104, forced vibration response calculation is performed or response calculation is performed by inputting proper external force, and its result is utilized.

Figure 6:
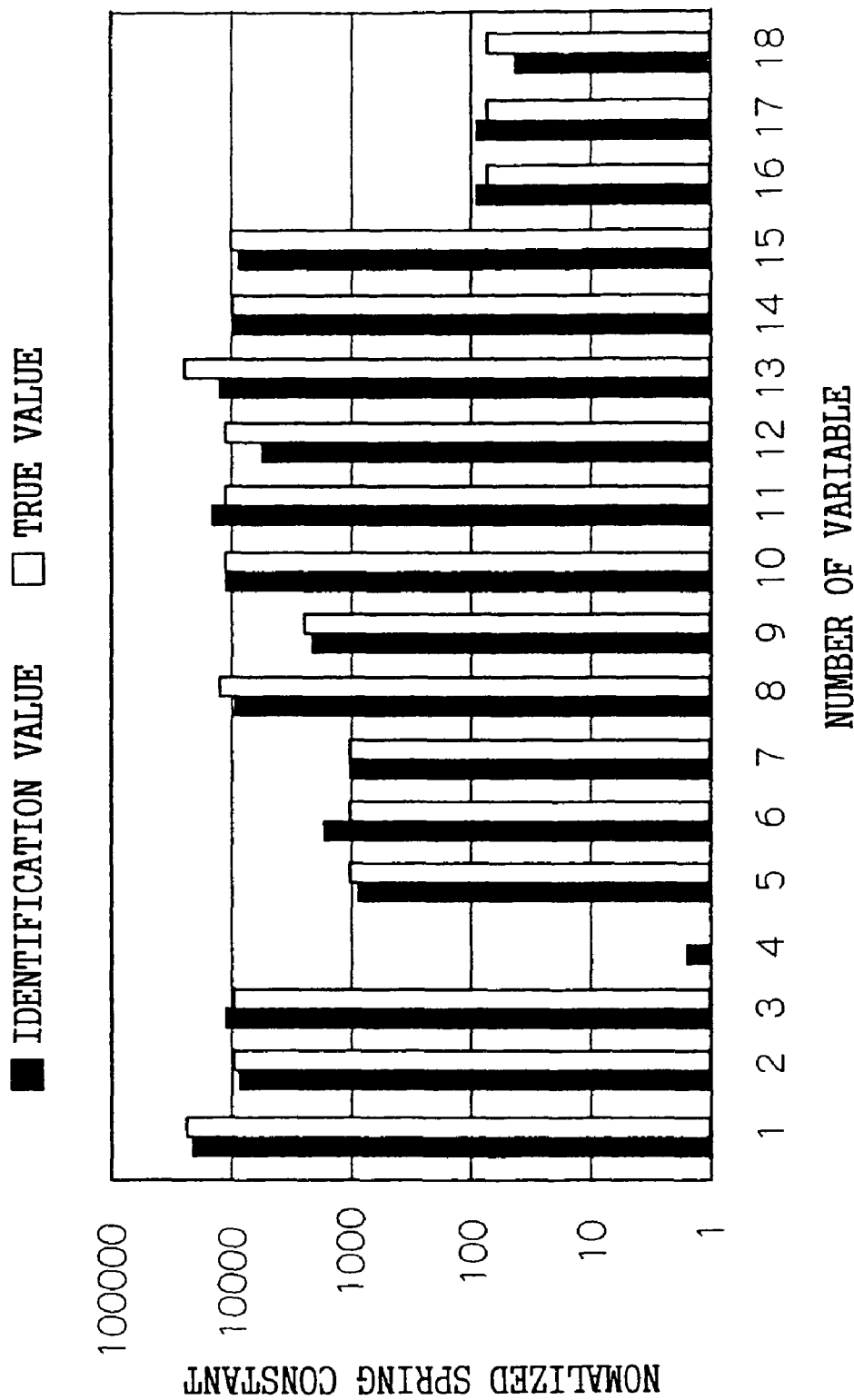
FIG. 6 is a graph showing an identification result in the embodiment comparing to an actual value.

FIG. 6 shows the result in which the experimental data of vibration simulating a brake noise phenomenon is set to reference data, 18 identification objects between components expressing the local stiffness of the contact portion between components is provided, and the identification object of the junction between components is present at a brake assembly state. As shown in FIG. 6, in the identification value to which the embodiment is applied, the good result is obtained for a true value.

When the finite-element method model becomes a large scale, as shown in FIG. 7, the boundary condition between components of the object of analysis can be efficiently identified in such a manner that a mode reducing model adopting the mode vector up to the necessary frequency band is used as the finite-element method model for each single component.

In the embodiment, making of a database of the obtained identification value can contribute to provision of a design manual for a boundary portion between components.

What is claimed is:

1. A computer implemented method of identifying a boundary condition between components of an object subjected to finite-element analysis, said object including a plurality of components, and having a plurality of elements positioned between the plurality of components, the method comprising the steps of:

calculating in an arithmetic device
a plurality of calculated mode vectors, and
natural frequencies or resonance frequencies of a plurality of components of the object said calculating step including executing a computer implemented finite-element method model of the object to indicate a boundary condition between the plurality of components of the object;

extracting an extracted, calculated mode vector of the plurality of calculated mode vectors having a degree of correlation at or above a predetermined threshold, said degree of correlation being relative to an experimental mode vector obtained in an experiment, said extracting step includes reducing a number of the plurality of calculated mode vectors by filtering said plurality of calculated mode vectors using at least one of order ratio filtering, component comparison filtering and frequency filtering; and identifying the boundary condition of the elements based on the extracted, calculated mode vector and the natural frequency or the resonance frequency corresponding to the extracted, calculated mode vector.

2. The method according to claim 1, wherein the step of extracting includes the steps of:

determining the degree of correlation at least one time by residual degrees of freedom when n degrees of freedom giving a largest degree of correlation are eliminated from arithmetic operation; and extracting the extracted, calculated mode vector when the degree of correlation exceeds the predetermined threshold.

3. The method according to claim 1, wherein the step of calculating includes:

defining a plurality of conditions for each of the elements and a plurality of levels for each of the plurality of conditions; and calculating the natural frequencies or the resonance frequencies of the finite-element method models and the calculated mode vectors by adopting an experimental design.

4. The method according to claim 1, wherein a mode reducing model of a single component in which the mode vector up to a necessary frequency band is adopted is used as the component of the finite-element method model.

5. The method according to claim 1, wherein the step of identifying the boundary condition comprising the steps of:

performing an arithmetic operation for an evaluation value indicating an error between the experiment and the calculation for each of a plurality of conditions based on the extracted, calculated mode vector and the natural frequency or the resonance frequency corresponding to the extracted, calculated mode vector; and identifying the boundary condition of the elements so that the evaluation value is minimized.

6. The method according to claim 1, wherein the step of identifying the boundary condition comprising the steps of:

identifying the boundary condition between the components by using a spring between the components as an element contained in the finite-element method models to identify a spring constant of the spring between the components.

7. A computer program product embodied on a computer-readable recording medium, comprising code, when executed causes a computer to perform steps comprising:

calculating in an arithmetic device
a plurality of calculated mode vectors, and
natural frequencies or resonance frequencies of a plurality of components of the object said calculating step including executing a computer implemented finite-element method model on the object to indicate a boundary condition between the plurality of components of the object;

extracting an extracted, calculated mode vector of the plurality of calculated mode vectors having a degree of correlation at or above a predetermined threshold, said degree of correlation being relative to an experimental mode vector obtained in an experiment, said extracting step includes reducing a number of the plurality of calculated mode vectors by filtering said plurality of calculated mode vectors using at least one of order ratio filtering, component comparison filtering and frequency filtering; and identifying the boundary condition of the elements based on the extracted, calculated mode vector and the natural frequency or the resonance frequency corresponding to the extracted, calculated mode vector.

8. The method of claim 1, wherein said extracting step further comprises determining a degree of correlation of remaining calculated mode vectors after said filtering step.

9. The method of claim 1, wherein said predetermined threshold being 0.8 or larger.

* * * * *